US012119860B2

(12) United States Patent
Nicholson

(10) Patent No.: US 12,119,860 B2
(45) Date of Patent: Oct. 15, 2024

(54) PROTECTIVE COVER FOR PORTABLE ELECTRONIC DEVICE

(71) Applicant: Kyle T. Nicholson, Myrtle Beach, SC (US)

(72) Inventor: Kyle T. Nicholson, Myrtle Beach, SC (US)

( * ) Notice: Subject to any disclaimer, the term of this patent is extended or adjusted under 35 U.S.C. 154(b) by 249 days.

(21) Appl. No.: 17/549,050

(22) Filed: Dec. 13, 2021

(65) Prior Publication Data

US 2022/0231719 A1 Jul. 21, 2022

Related U.S. Application Data

(60) Provisional application No. 63/138,658, filed on Jan. 18, 2021.

(51) Int. Cl.
*H04B 1/3888* (2015.01)
*H04M 1/02* (2006.01)

(52) U.S. Cl.
CPC ........ *H04B 1/3888* (2013.01); *H04M 1/0202* (2013.01)

(58) Field of Classification Search
CPC ........................... H04M 1/0202; H04B 1/3888
See application file for complete search history.

(56) References Cited

U.S. PATENT DOCUMENTS

| D651,205 | S | * | 12/2011 | Soekoro | D14/250 |
| 9,653,934 | B2 | | 5/2017 | Forristall et al. | |
| 9,995,432 | B1 | | 6/2018 | Girault | |
| D883,268 | S | | 5/2020 | Daniel | |
| 10,849,413 | B2 | | 12/2020 | Hayes | |
| 11,290,142 | B2 | * | 3/2022 | Ferrantello | H04B 1/3888 |
| 2007/0299322 | A1 | * | 12/2007 | Miyajima | A61B 5/0533 |
| | | | | | 600/301 |
| 2012/0042476 | A1 | | 2/2012 | Karmatz | |
| 2016/0036480 | A1 | | 2/2016 | Hirsch | |
| 2016/0049983 | A1 | | 2/2016 | Ripka | |
| 2021/0028809 | A1 | * | 1/2021 | Altschul | H04B 1/3888 |

FOREIGN PATENT DOCUMENTS

KR 20150068725 A * 6/2015 ............. A45C 13/04

* cited by examiner

*Primary Examiner* — Keith Ferguson
(74) *Attorney, Agent, or Firm* — P. Jeff Martin; The Law Firm of P. Jeffrey Martin, LLC

(57) ABSTRACT

An aftermarket accessory in the form of a protective cover or case for a mobile electronic device. The protective cover includes a planar body and a grip element rigidly extending outwardly therefrom. The grip element includes a plurality of loops adjacently aligned and forming a plurality of finger through holes.

9 Claims, 12 Drawing Sheets

PROTECTIVE COVER FOR PORTABLE ELECTRONIC DEVICE

I. RELATED APPLICATIONS

This application claims priority to U.S. Provisional Patent Application No. 63/138,658, filed on Jan. 18, 2021, the disclosure of which is hereby incorporated by reference in its entirety.

II. FIELD OF THE INVENTION

The present application discloses and describes a protective cover and/or case for a portable electronic device.

III. MOTIVATION OF THE INVENTOR

Presently, the prior art discloses devices for protecting mobile electronic devices against damage and devices for enhancing grasp and grip thereof.

A search of the prior art did not disclose any patents that read directly on the claims of the instant invention; however, the following references were considered related:
- U.S. Pat. No. 9,653,934 B2, issued in the name of Forristall et al.;
- U.S. Patent Application No. 2016/0049983 A1, published in the name of Ripka;
- U.S. Pat. No. 10,849,413 B2, issued in the name of Hayes;
- U.S. Pat. No. 9,995,432 B1, issued in the name of Girault;
- U.S. Patent Application No. 2012/0042476, published in the name of Karmatz;
- U.S. Pat. No. D883,268 S, issued in the name of Daniel; and
- U.S. Patent Application No. 2016/0036480 A1, published in the name of Hirsch.

Accordingly, a need continues to exist and is recognized for improvements to aftermarket accessories for mobile electronic devices, such as protective guards and cases, which provide both an enhanced firm hold and grip.

This application presents claims and embodiments that fulfill a need or needs not yet satisfied by the products, inventions and methods previously or presently available. In particular, the claims and embodiments disclosed herein describe a protective cover for a portable electronic device, the cover comprising a planar body having a continuous, peripheral sidewall extends integrally upward therefrom; a plurality of distal phalanx braces integrally projecting transversely from the outer surface of the body; and a grip element, the grip element rigidly extending integrally, perpendicularly along an outer longitudinal side surface and an outer bottom side surface of the peripheral sidewall of the body, the grip element includes a plurality of loops adjacently aligned and forming a plurality of finger through holes, the protective cover providing unanticipated and nonobvious combination of features distinguished from the products, inventions and methods preexisting in the art. The applicant is unaware of any device, apparatus, method, disclosure or reference that discloses the features of the claims and embodiments disclosed herein.

IV. SUMMARY OF THE INVENTION

An aftermarket accessory in the form of a protective cover or case device for a mobile electronic device is disclosed. More particularly, a cover device adapted and configured for protecting electronic smart phone devices is disclosed.

According to one embodiment, the protective cover comprises a body having a continuous, peripheral sidewall.

The body includes a grip element rigidly extending integrally, perpendicularly along an outer longitudinal side surface of the peripheral sidewall of the body. The grip element includes one or more loops adjacently aligned and forming a plurality of finger through holes.

According to one embodiment, the grip element may comprise a generally, crescent-shaped configuration.

According to another embodiment, the grip element is designed and configured in the form of a "brass knuckle-type" grip.

In accordance to one embodiment, the body includes one or more distal phalanx braces integrally projecting transversely from the outer surface of the body.

In accordance to another embodiment, the body may further include one or more middle phalanx rests in the form of minor recesses disposed along the outer surface of the body adjacent the continuous, peripheral sidewall supporting the grip element.

In accordance to still another embodiment, a protective case for a portable electronic device, such as a smart phone is disclosed. The protective case comprises a bottom portion and a top portion, the top portion is detachably securable to the bottom portion. The top portion comprises an annular jacket. The bottom portion comprises a generally planar body from which a continuous, peripheral sidewall extends integrally upward therefrom.

The body comprises a grip element rigidly extending integrally, perpendicularly along an outer longitudinal side surface of the continuous, peripheral sidewall of the body.

In accordance to one embodiment, the grip element may comprise a generally, crescent-shaped configuration comprising one or more loops each of which forming finger through holes.

In accordance to another embodiment, the grip element is designed and configured in the form of a "brass knuckle-type" grip.

In accordance to still another embodiment, one or more distal phalanx braces integrally project transversely from the outer surface of the body.

According to another embodiment, the body of the bottom portion may include one or more middle phalanx rests in the form of minor recesses disposed along the outer surface of the body adjacent the continuous, peripheral sidewall supporting the grip element.

According to another embodiment, the grip element is adapted and configured to be detachably secured to the protective cover body or to the body of the bottom portion via a tether and coupling means or other means for facilitating detachable coupling of the grip element to the cover body or the body of the bottom portion.

According to yet another embodiment, a protective cover for a portable electronic device is disclosed, wherein the cover comprises a generally planar body from which a continuous, peripheral sidewall extends integrally upward therefrom, and a grip element pivotally attached to an outer surface of the body via a pivot means adapted to allow the grip element to be positioned in a flat, compact configuration atop the rear surface of the body.

V. BRIEF DESCRIPTION OF THE DRAWING(S)

The advantages and features of the present invention will become better understood with reference to the following more detailed description and claims taken in conjunction with the accompanying drawings, in which like elements are identified with like symbols, and in which:

Figure 4:
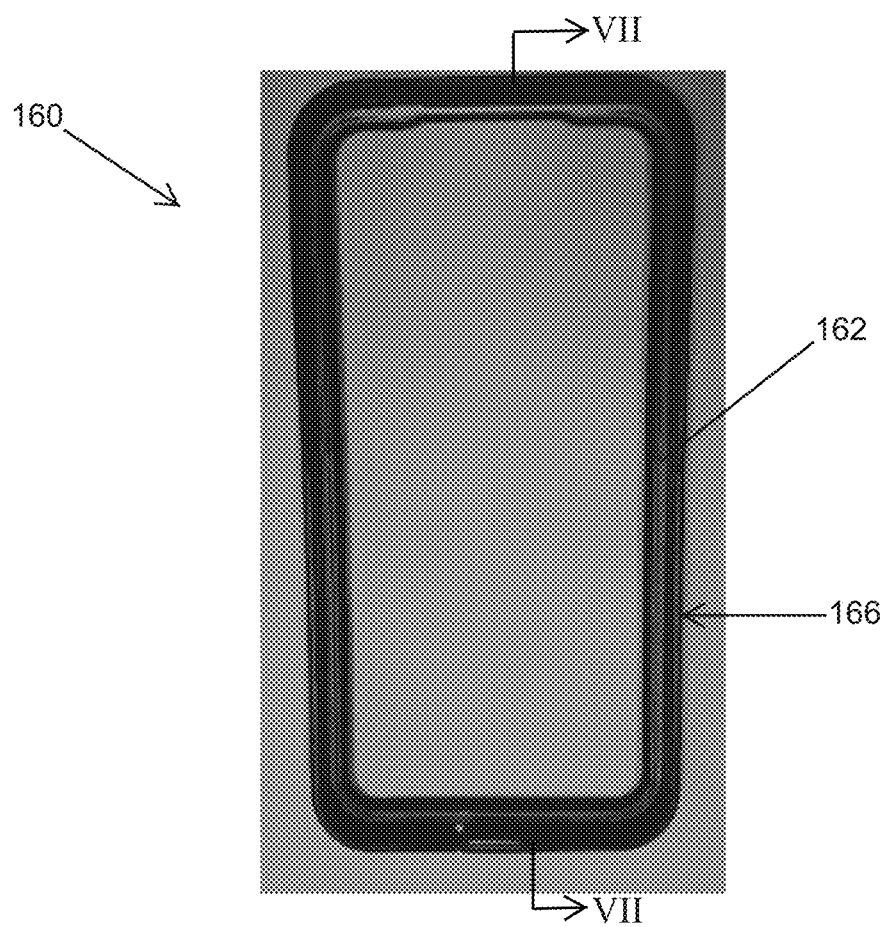
FIG. 4 is a top plan view of the top portion of a protective case for a portable electronic device, in accordance to one embodiment of the present invention.
Figure 6:
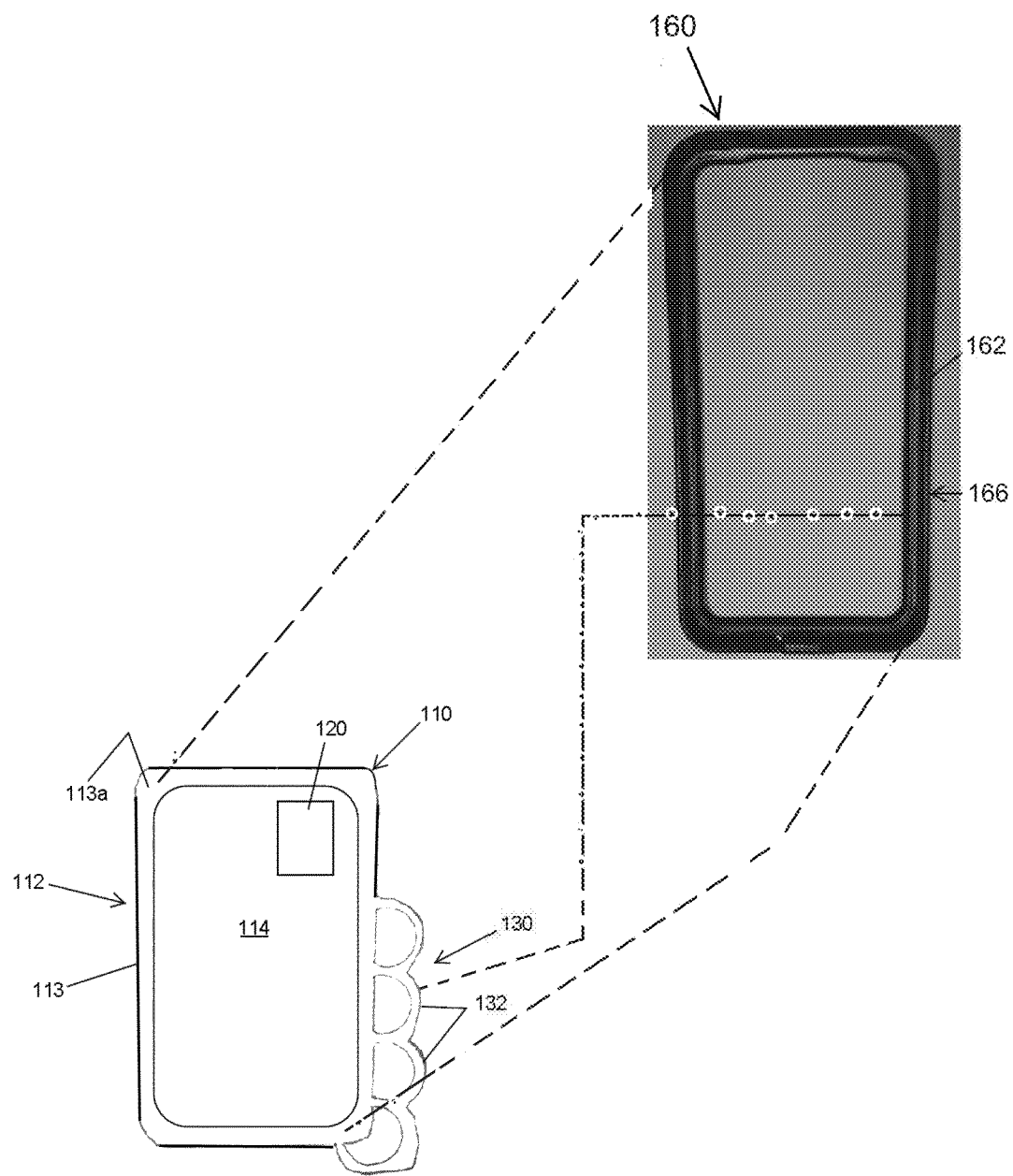
Figure 7:
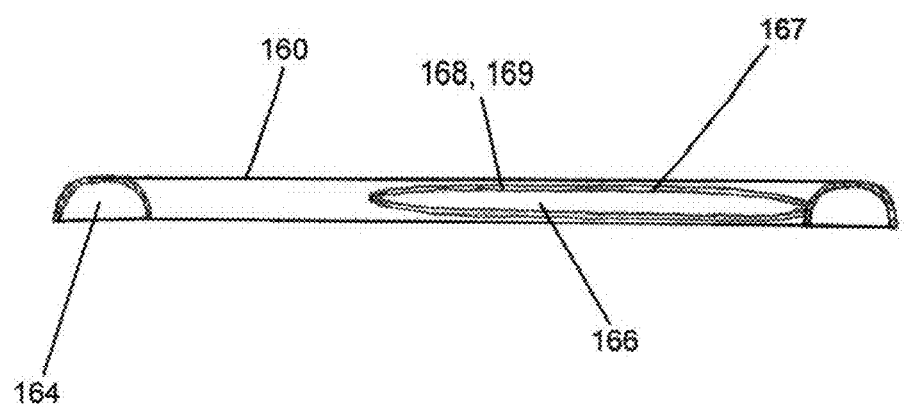

FIG. 6 is an exploded view showing detachable securement of the top portion to the bottom portion of the protective case, according to one embodiment of the present invention; and FIG. 7 is a cross-sectional view taken along lines VII-VII of FIG. 4, illustrating an O-ring disposed about a window along an interior of the bottom portion of the case, in accordance to one embodiment of the present invention.

VI. DESCRIPTION OF THE EMBODIMENT(S)

Figure 1:
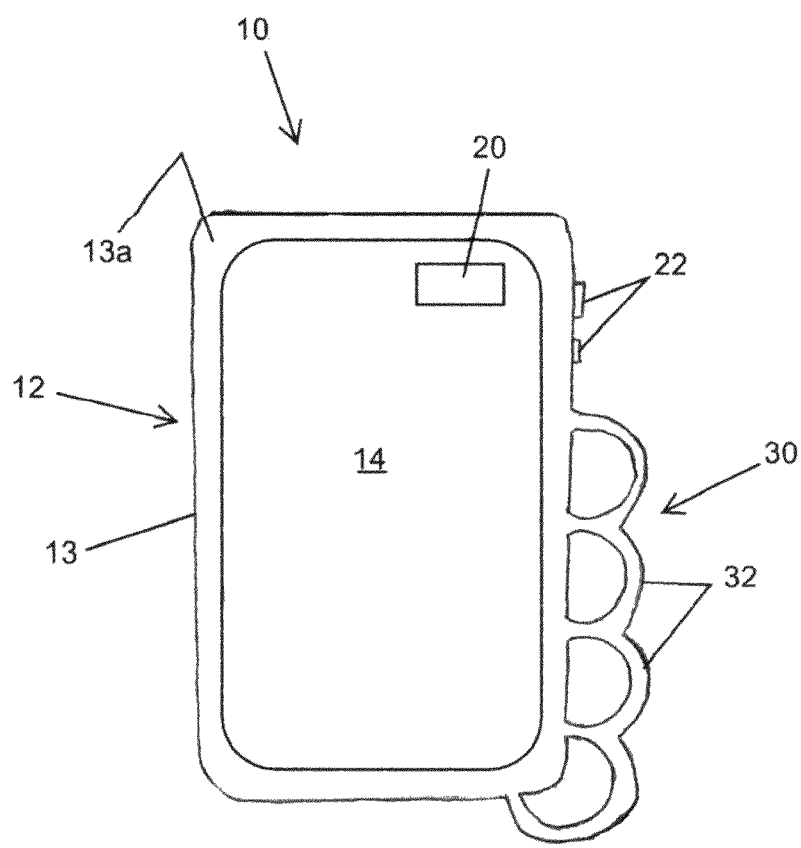
FIG. 1 depicts a top plan view of a protective cover for a portable electronic device, in accordance to one embodiment of the present invention.
Figure 2:
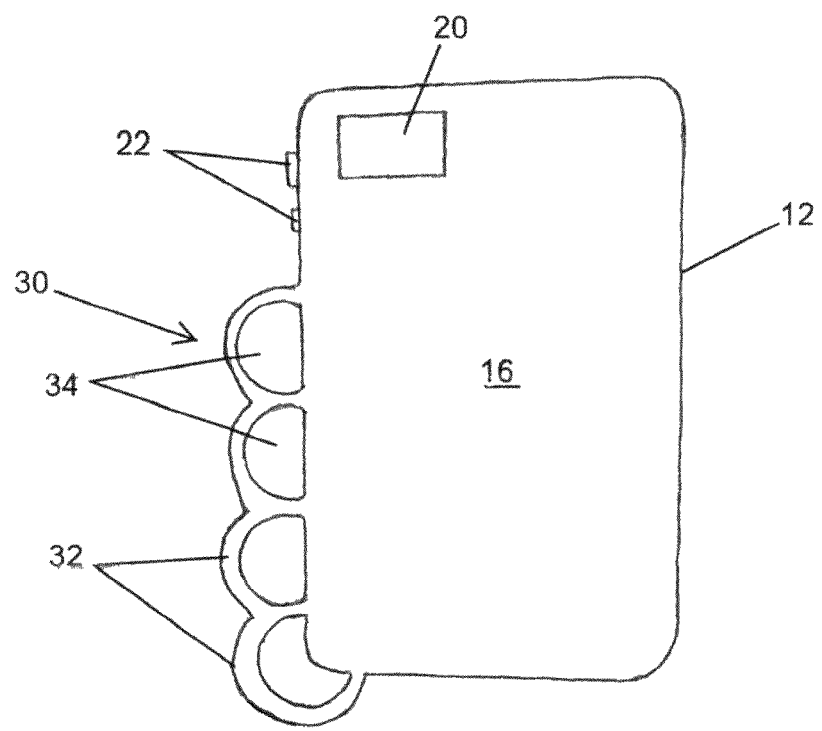
FIG. 2 is a bottom plan view of the protective cover of FIG. 1.

In accordance with FIGS. 1-2, a protective cover for a portable electronic device 10 is disclosed for use with mobile electronic devices such as mobile phones, tablets, portable media players, personal digital assistants (PDAs), and more particularly for use with mobile electronic smart phone devices 3 such as including, but not limited to, an Apple® iPhone®, a Samsung GALAXY®, and an LG G7®. The protective cover for a portable electronic device 10, hereinafter "cover 10", is adapted and configured to snugly enclose an entire verso surface and perimeter of a mobile electronic device 2 in a snug-fit, removably-secured manner. For purposes of this disclosure, the term "snug-fit" is defined as a substantially-intimate, close-fitting relationship. The cover 10 comprises a generally planar body 12 from which a continuous, peripheral sidewall 13 extends integrally upward therefrom. The sidewall 13 has an upper edge which extends into a slightly incurvate lip 13a. The body 12 includes a front or interior surface 14 and a rear or outer surface 16. The body 12 is adapted with apertures 20 defined therein being shaped, sized, and oriented to accommodate features (e.g., camera lens) of a commercially-available mobile electronic device 2 in a match-fit, positional manner. The body 12 is envisioned to further include button cusps 22 for receiving operational buttons of the mobile electronic device 2, such as the power and volume buttons. Alternatively, it is further envisioned the body 12 may comprise removable panels or cut-out portions (not shown), gains, and/or apertures 20 and button cusps 22. The cut-outs may be scored to facilitate quick, easy, and efficient removal thereof.

The body 12 further comprises a grip element 30 rigidly extending integrally, perpendicularly along an outer longitudinal side surface and outer bottom side surface of the continuous, peripheral sidewall 13 of the body 12. In accordance to one embodiment, the grip element 30 may comprise a generally, crescent-shaped configuration comprising at least one loop 32 forming a finger through hole 34. Preferably, the grip element 30 comprises a plurality of loops 32 adjacently aligned and forming a plurality of finger through holes 34. Most preferably, grip element 30 comprises four loops 32 adjacently aligned and forming four finger through holes 34 sized for receiving user's index finger, middle finger, ring finger, and pinkie; user's thumb remaining free to navigate and operate the interface of the electronic mobile device 2 via the display screen 4 thereof.

In accordance to another embodiment, the grip element 30 is designed and configured in the form of a "brass knuckle-type" grip.

In accordance to one embodiment, the body 12 (including grip element 30) is constructed of a lightweight, rigid or semi-rigid material which may be selected from the group which includes, but is not limited to, thermoplastic olefin composition, polyolefin composition, plastic, thermoplastic, metal or a metallic-plastic composite. Preferred plastic and thermoplastic materials include, but are not limited to, thermoplastic olefin elastomer composition, polystyrene, polyvinyl chloride (PVC), polypropylene, acrylonitrile-butadiene-styrene (ABS), polyethylene, polyurethane, polycarbonate, or blends thereof, and ABS/Nylon blend.

Figure 2A:
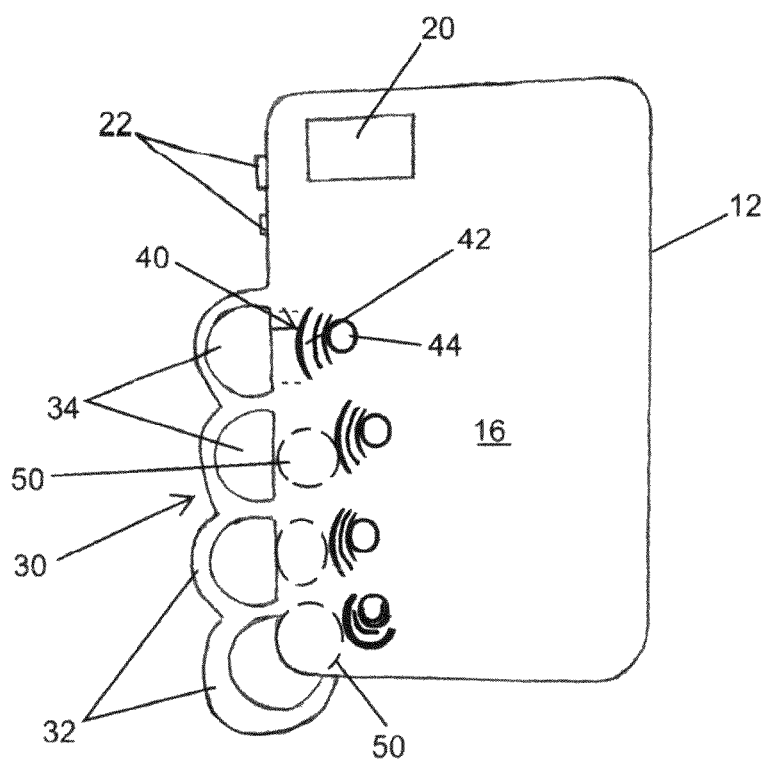
FIG. 2A is a bottom plan view of the bottom portion of a protective cover, in accordance to another embodiment of the present invention.
Figure 3:
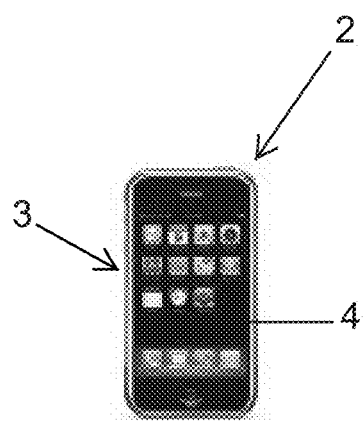
FIG. 3 depicts an exemplary mobile electronic device.

Referring now more particularly to FIG. 2A, in accordance to another embodiment, at least one distal phalanx brace 40 integrally projects transversely from the outer surface 16 of the body 12. Preferably a plurality of distal phalanx braces 40 integrally projects transversely from the outer surface 16 of the body 12. Most preferably, the number of distal phalanx braces 40 are equal to the number of loops 32, such as for example, a body 12 comprising four loops 32 and four distal phalanx braces 40, as depicted in FIG. 2A. Each distal phalanx brace 40 comprises a protruding ridge 42 having a first side and a second side, the ridge 42 terminating upwardly into a curved crest from which the second side of the ridge 42 integrally extends downwardly to a fingertip receiver 44. The fingertip receiver 44 is a concavity slightly recessed below the outer surface 16 of the body 12. The crest may be horizontally-oriented, or may be concave-shaped, or convex-shaped.

The grip element 30 and distal phalanx braces 40 combine to provide an ergonomically designed protective cover for a portable electronic device 10 that is uniquely configured to impart user with optimum grip when using the mobile electronic device 2, such as for example, when taking "selfie" pictures.

Importantly, the protective cover 10 of the present application as designed, shaped, configured and contoured, imparts previously-described functional advantages and features that are unanticipated and nonobvious when compared to the prior art. More specifically, the protective cover 10, as described herein, is neither anticipated, taught, suggested, nor disclosed by the prior art.

In further reference to FIG. 2A, in accordance with another embodiment, one or more middle phalanx rests 50, in the form of minor recesses, are disposed along the outer surface 16 of the body 12 adjacent the continuous, peripheral sidewall 13 and lower corner thereof supporting the grip element 30. Preferably a plurality of middle phalanx rests 50 is disposed along the outer surface 16 of the body 12. Most preferably, the number of middle phalanx rests 50 is equal to the number of distal phalanx braces 40 and loops 32. The middle phalanx rests 50 are oriented juxtaposition, respectively, to the finger through holes 34.

Figure 4A:
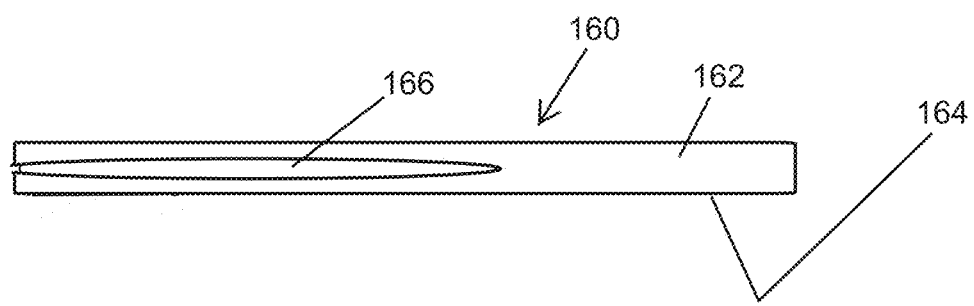
FIG. 4A is a left side elevational view of the top portion of the protective case of FIG. 4.
Figure 5:
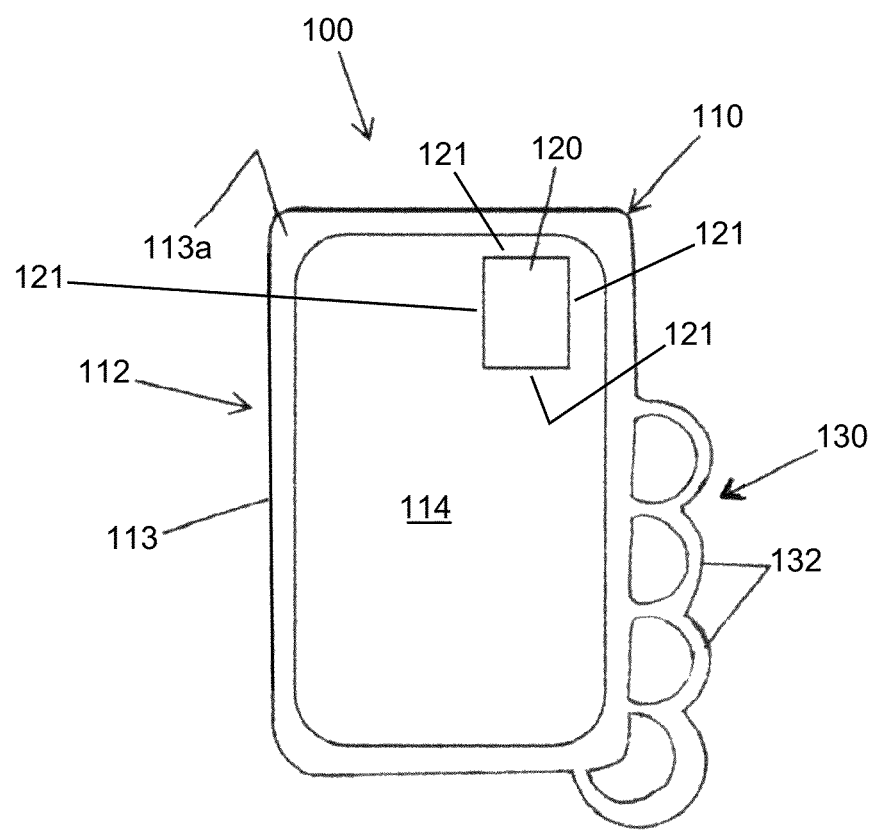
FIG. 5 is a top plan view of the bottom portion of a protective case for a portable electronic device, according to one embodiment of the present invention.

Referring now to FIGS. 4-6, and more particularly FIGS. 4-4A, in accordance to another embodiment, a protective case for a portable electronic device 100 is disclosed for use with mobile devices such as mobile phones, tablets, portable media players, personal digital assistants (PDAs), and more particularly for use with mobile electronic smart phone devices such as including, but not limited to, an Apple® iPhone®, a Samsung GALAXY®, and an LG G7®. The protective case for a portable electronic device 100, hereinafter "case 100", is adapted and configured to snugly enclose an entire verso surface and perimeter of a mobile electronic device 2 in a snug-fit, removably-secured manner. The case 100 comprises a bottom portion 110 and a top portion 160, the top portion 160 is detachably securable to the bottom portion 110. The top portion 160 comprises an annular jacket 162 comprising a generally rectangular, incurvate configuration forming a mating receptacle 164 along the rear side thereof, wherein the mating receptacle 164 is adapted for allowing the top and bottom portions 160 and 110 to be detachably secured to one another, and securing the mobile electronic smart phone device 3 mesial the top and bottom portions 160 and 110. The mating receptacle 164 is configured for receiving and securing the continuous lip 113a therein via a snap-fit arrangement or mechanical interferential fit.

The top portion 160 further comprises a window 166 defined through a longitudinal side surface and segment of the outer bottom side surface of the jacket 162. The window 166, and more particularly the function thereof, shall be described later in greater detail.

Referring now more particularly to FIGS. 4-6, the bottom portion 110 comprises a generally planar body 112 from which a continuous, peripheral sidewall 113 extends integrally upward therefrom. The sidewall 113 has an upper edge which extends into a slightly incurvate, continuous lip 113a. The body 112 includes a front interior surface 114 and a rear outer surface 116. The body 112 is adapted with one or more apertures 120 defined therein being shaped, sized, and oriented to accommodate features (e.g., camera lens) of a commercially-available mobile electronic device 2 in a size-fit, shape, and positional matched manner. In particular reference to FIG. 5C, an annular membrane 122 is disposed along the continuous inner lip edge 121 of the aperture 120 on the front interior surface 114 of the body 112 of the bottom portion 110. The annular membrane 122, such as an O-ring 124, provides a water-impermeable seal about aperture 120 so as to protect the camera lens when the top portion 160 is detachably secured to the bottom portion 110.

In reference to FIGS. 4, 4A, 5, 6, and 7, the rear side of the mobile electronic device 2 (such as a mobile electronic smart phone device 3) is positioned planar against the front interior surface 114 of the body 112 of the bottom portion 110 of the case and a grip element 130 (to be described later in greater detail) of the bottom portion 110 is received through the window 166 of the top portion 160 of the case. The continuous lip 113a of the bottom portion 110 is received and secured in the mating receptacle 164 of the top portion 160 via a snap-fit arrangement or mechanical interferential fit, thereby detachably securing the mobile electronic device 2 mesial the top portion 160 and the bottom portion 110.

An annular membrane 168 is disposed along the continuous inner lip edge 167 of the window 166 on the bottom surface of the jacket 162 of the top portion 160. The annular membrane 168, such as an O-ring 169, provides a water-impermeable seal about window 166 when the top portion 160 is detachably secured to the bottom portion 110.

The body 112 is envisioned to further include button cusps (not shown in this particular embodiment) for receiving operational buttons of the mobile electronic device 2, such as the power and volume buttons. Alternatively, it is further envisioned the body 112 may comprise removable panels or cut-out portions (also not shown), gains, and/or apertures 120 and button cusps. The cut-outs may be scored to facilitate quick, easy, and efficient removal thereof.

The body 112 further comprises a grip element 130 rigidly extending integrally, perpendicularly along an outer longitudinal side surface and outer bottom side surface of the continuous, peripheral sidewall 113 of the body 112. In accordance to one embodiment, the grip element 130 may comprise a generally, crescent-shaped configuration comprising one or more loops 132 each of which forming finger through holes 134. Preferably, grip element 130 comprises four loops 132 adjacently aligned and forming four finger through holes 134 sized for receiving user's index finger, middle finger, ring finger, and pinkie; user's thumb remaining free to navigate and operate the interface of the electronic mobile device 2 via the display screen 4 thereof.

In accordance to another embodiment, the grip element 130 is designed and configured in the form of a "brass knuckle-type" grip.

Figure 5A:
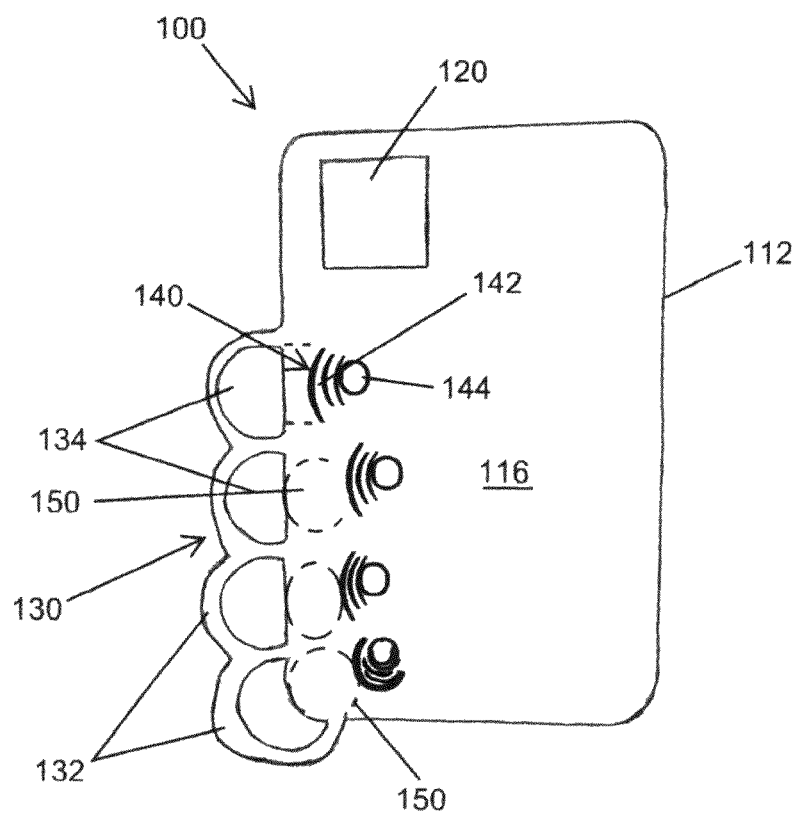
FIG. 5A is a bottom plan view of the bottom portion of the protective case of FIG. 5.
Figure 5B:
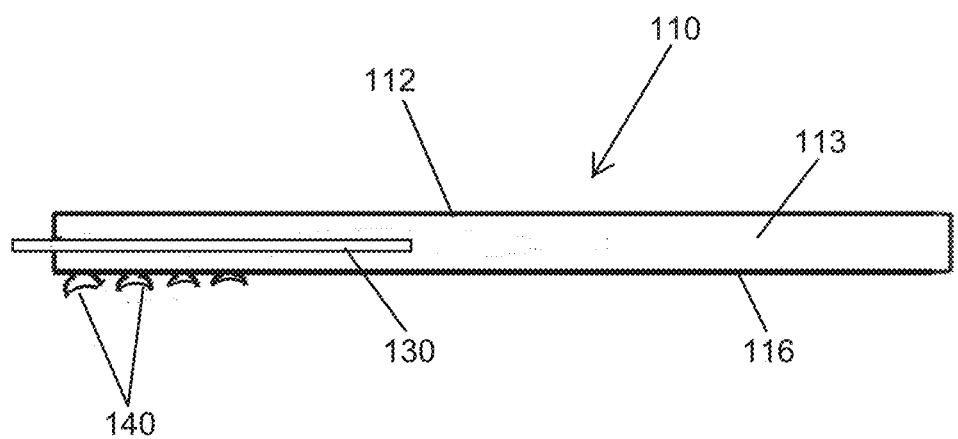
FIG. 5B is a left side elevational view of the bottom portion of the protective case of FIGS. 5 and 5A.
Figure 5C:
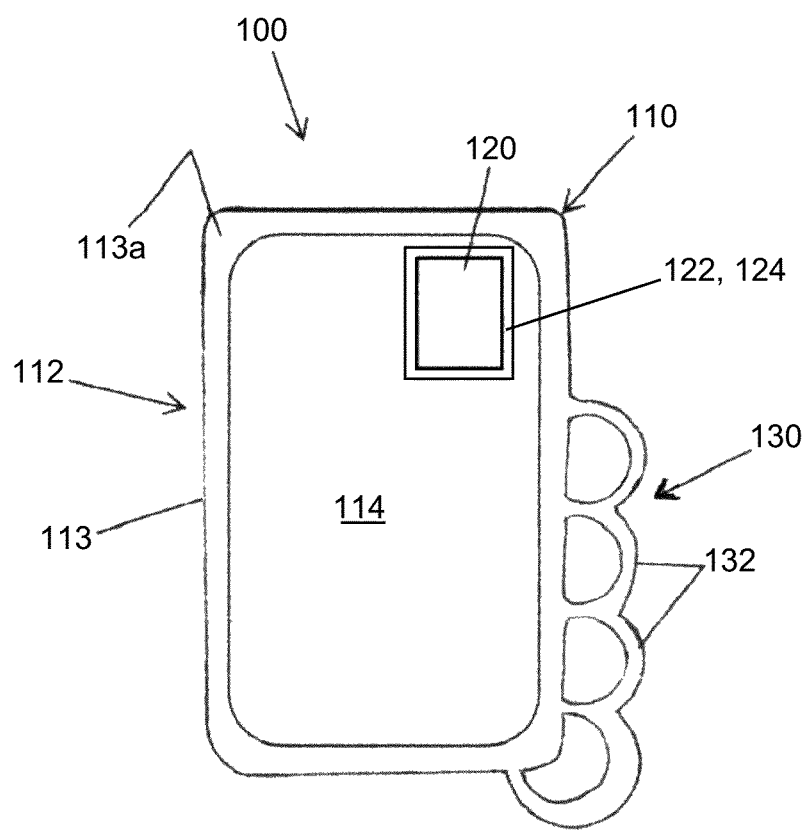
FIG. 5C is a top plan view of the bottom portion of a protective case for a portable electronic device illustrating an O-ring disposed about an aperture thereof, in accordance to an alternate embodiment of the present invention.

Referring now more particularly to FIG. 5A, in accordance to another embodiment, one or more distal phalanx braces 140 integrally project transversely from the outer surface 116 of the body 112. Preferably a plurality of distal phalanx braces 140 integrally projects transversely from the outer surface 116 of the body 112. Most preferably, the number of distal phalanx braces 140 are equal to the number of loops 132, such as for example, a body 112 comprising four loops 132 and four distal phalanx braces 140, as depicted in FIG. 5A. Each distal phalanx brace 140 comprises a protruding ridge 142 having a first side and a second side, the ridge 142 terminating upwardly into a curved crest from which the second side of the ridge 142 integrally extends downwardly to a fingertip receiver 144. The fingertip receiver 144 is a concavity slightly recessed below the outer surface 116 of the body 112. The crest may be horizontally-oriented, or may be concave-shaped, or convex-shaped.

It is envisioned the body 112 of the bottom portion 110 may include one or more middle phalanx rests 150, in the form of minor recesses, wherein the middle phalanx rests 150 are disposed along the outer surface 116 of the body 112 adjacent the continuous, peripheral sidewall 113 and lower corner thereof supporting the grip element 130.

In accordance to still another alternate embodiment, the grip element is adapted and configured to be detachably secured to the protective cover body via a tether and coupling means or other means for facilitating detachable coupling of the grip element 30, 130 to the cover body.

Finally, in accordance to yet another embodiment, a protective cover for a portable electronic device is disclosed, wherein the cover comprises a generally planar body from which a continuous, peripheral sidewall extends integrally upward therefrom. The body includes a front or interior surface and a rear or outer surface. The body further comprises a grip element pivotally attached to an outer longitudinal side surface of the peripheral sidewall of the body via a pivot means. The pivot means is adapted to rotate the grip element about a specific angle of rotation or orientation. It is envisioned pivot means is adapted to articulate through approximately 180° of rotation and is further adapted and configured for being settable positionally in multiple fixed points along the 180° of rotation. More particularly, it is envisioned that the pivot means (and thus grip element) is adapted and configured for positioning about degrees of rotation selected from the group which includes, but is not limited to, approximately every 10°, 20°, 30°, and 45° of rotation, whether clockwise or counterclockwise in reference. In accordance to one embodiment, when pivotally rotated clockwise to 180°, the grip element is positioned coplanar to the rear surface of the body. When pivotally rotated counterclockwise from 180° to 0°, the grip element lies superjacent and parallel to the rear surface of the body in a fixed, overlapped position, thereby allowing the protective cover for a portable electronic device to be oriented in a compact configuration ("storage position") facilitating quick, easy, and efficient storage and transport thereof, such as placement in a user's pocket or handbag.

A retention mechanism is disclosed for removably retaining the grip element in the storage position. In accordance to one embodiment, the retention mechanism comprises a stem and a retainer, wherein the stem has a lower end integrally extending perpendicularly from the verso or rear surface of the grip element. A flange or lobe is integrally disposed at the upper end of stem.

The retainer comprises a base bifurcating into a pair of biased clamping members. The base integrally projects perpendicularly from the rear surface of the body. The clamping members define an arcuate or curved shape with distal ends. In a resting position, the clamping members are biased to exert a compressional force such that the distal ends of the clamping members are firmly engaged in contact forming a spaced cavity for receiving and retaining the lobe of the post in a removably secured manner. A force that would tend to push the lobe against the distal ends of the clamping members to a disengaged or unclamped position is resisted by increased compressional biasing force of the clamping members. Thus, to removably retain the grip element in the storage position, the grip element is pivoted counterclockwise and engages the closed distal ends of the clamping members, and thereafter applying a degree of force suitable to allow the lobe to pass between the distal ends of the clamping members and into the spaced cavity thereof, thereby retaining the grip element in a removably secured manner. Other means suitable for detachably coupling the grip element superjacent and parallel to the rear surface of the body are envisioned, such as including, but not limited to, Velcro®, snap-fasteners, clip mechanisms, and the like.

In further accordance to the instant embodiment, the grip element comprises one or more loops each forming a finger through hole.

In still further accordance to the instant embodiment, the body may further comprise one or more distal phalanx braces integrally projecting transversely from the rear surface of the body. The distal phalanx braces are oriented such that upon positioning of the grip element in the storage position, the distal phalanx braces pass through the finger through holes of the loops.

It is to be understood that the embodiments and claims are not limited in application to the details of construction and arrangement of the components set forth in the description and/or illustrated in drawings. Rather, the description and/or the drawings provide examples of the embodiments envisioned, but the claims are not limited to any particular embodiment or a preferred embodiment disclosed and/or identified in the specification. Any drawing figures that may be provided are for illustrative purposes only, and merely provide practical examples of the invention disclosed herein. Therefore, any drawing figures provided should not be viewed as restricting the scope of the claims to what is depicted.

The embodiments and claims disclosed herein are further capable of other embodiments and of being practiced and carried out in various ways, including various combinations and sub-combinations of the features described above but that may not have been explicitly disclosed in specific combinations and sub-combinations.

Accordingly, those skilled in the art will appreciate that the conception upon which the embodiments and claims are based may be readily utilized as a basis for the design of other structures, methods, and systems. In addition, it is to be understood that the phraseology and terminology employed herein are for the purposes of description and should not be regarded as limiting the claims.

What is claimed is:

1. A protective case for a portable electronic device, the case comprises:
    a bottom portion, the bottom portion comprises a generally planar body from which a continuous, peripheral sidewall extends integrally upward therefrom, the body includes an interior surface and an outer surface;
    a top portion, the top portion is detachably securable to the bottom portion, and wherein the top portion comprises an annular jacket and a window defined through a longitudinal side surface and segment of an outer bottom side surface of the jacket; and
    a grip element rigidly extending integrally, perpendicularly along an outer longitudinal side surface and an outer bottom side surface of the continuous, peripheral sidewall of the body, the grip element being received through the window of the top portion.

2. The case of claim 1, wherein the body of the bottom portion comprises at least one of apertures, button cusps, and cut-outs shaped, sized, and oriented to accommodate features and operational buttons of a commercially-available mobile electronic device in a match-fit, positional manner.

3. The case of claim 1, wherein the body comprises at least one of apertures, button cusps, and cut-outs shaped, sized, and oriented to accommodate features and operational buttons of a commercially-available mobile electronic device in a match-fit, positional manner.

4. The case of claim 1, wherein the grip element comprises at least one loop forming a finger through hole.

5. The case of claim 1, wherein the grip element comprises a plurality of loops adjacently aligned and forming a plurality of finger through holes.

6. The case of claim 1, wherein the grip element comprises four loops adjacently aligned and forming four finger through holes.

7. The case of claim 6, wherein the grip element comprises a generally, crescent-shaped configuration.

8. The case of claim 6, wherein the grip element comprises a brass knuckle designed configuration.

9. The case of claim 1, wherein the body comprises at least one distal phalanx brace integrally projecting transversely from the outer surface thereof the body.

* * * * *